(12) United States Patent
Kiya

(10) Patent No.: US 10,286,775 B2
(45) Date of Patent: May 14, 2019

(54) VEHICLE

(75) Inventor: Nobuaki Kiya, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 1073 days.

(21) Appl. No.: 14/398,288

(22) PCT Filed: May 17, 2012

(86) PCT No.: PCT/JP2012/003245
§ 371 (c)(1),
(2), (4) Date: Oct. 31, 2014

(87) PCT Pub. No.: WO2013/171797
PCT Pub. Date: Nov. 21, 2013

(65) Prior Publication Data
US 2015/0133041 A1    May 14, 2015

(51) Int. Cl.
   *B24D 13/00* (2006.01)
   *B60K 11/06* (2006.01)
   (Continued)

(52) U.S. Cl.
   CPC ............... *B60K 11/06* (2013.01); *B60K 1/04* (2013.01); *B60L 1/003* (2013.01); *B60L 3/0007* (2013.01); *B60L 11/1803* (2013.01); *B60L 11/1864* (2013.01); *B60L 11/1874* (2013.01); *B60L 11/1877* (2013.01); *B60L 11/1879* (2013.01); *H01M 2/1083* (2013.01);
   (Continued)

(58) Field of Classification Search
   CPC ......... B60K 1/04; B60K 11/06; B60K 11/00; H01M 10/42; H01M 10/50; H01M 2/10; H01M 10/46; H02J 7/04; B60R 11/06; B60R 11/00

USPC ........... 320/150; 454/69; 296/24.3; 180/65.1
See application file for complete search history.

(56) References Cited

U.S. PATENT DOCUMENTS

| | | | |
|---|---|---|---|
| 7,230,404 B2 * | 6/2007 | Kimoto | H01M 2/1077 320/150 |
| 2004/0232891 A1 | 11/2004 | Kimoto et al. | |

(Continued)

FOREIGN PATENT DOCUMENTS

| | | | |
|---|---|---|---|
| JP | 2002-186101 A | 6/2002 | |
| JP | 2003-346759 A | 12/2003 | |

(Continued)

*Primary Examiner* — Vivek K Shirsat
(74) *Attorney, Agent, or Firm* — Sughrue Mion, PLLC

(57) ABSTRACT

[PROBLEM] A collision of a blower motor with an electric storage unit is prevented.

[SOLVING MEANS] The present invention provides a vehicle including an electric storage unit having a plurality of electric storage elements and outputting an energy for use in running of the vehicle, a blower disposed closer to the exterior of the body of the vehicle than the electric storage unit and supplying the electric storage unit with air for adjusting the temperature of the electric storage element, and a duct disposed between the electric storage unit and the blower and connected to the electric storage unit or the blower. The duct has a collision avoiding portion guiding a blower motor of the blower in an up-down direction or a side direction of the electric storage unit when the blower motor is moved toward the electric storage unit upon application of an external force.

7 Claims, 8 Drawing Sheets

(51) Int. Cl.
  *B60K 1/04* (2019.01)
  *H01M 2/10* (2006.01)
  *B60L 1/00* (2006.01)
  *B60L 11/18* (2006.01)
  *H01M 10/625* (2014.01)
  *H01M 10/6563* (2014.01)
  *H01M 10/66* (2014.01)
  *H01M 10/613* (2014.01)
  *B60L 3/00* (2019.01)
  *B60K 1/00* (2006.01)

(52) U.S. Cl.
  CPC ....... *H01M 2/1094* (2013.01); *H01M 10/613* (2015.04); *H01M 10/625* (2015.04); *H01M 10/6563* (2015.04); *H01M 10/66* (2015.04); *B60K 2001/005* (2013.01); *B60K 2001/0433* (2013.01); *B60L 2210/10* (2013.01); *B60L 2240/545* (2013.01); *B60Y 2306/01* (2013.01); *Y02T 10/7005* (2013.01); *Y02T 10/7061* (2013.01); *Y02T 10/7216* (2013.01)

(56) References Cited

U.S. PATENT DOCUMENTS

| | | | |
|---|---|---|---|
| 2012/0115001 A1 | 5/2012 | Hatta et al. | |
| 2013/0220713 A1* | 8/2013 | Watanabe | B60K 1/04 180/65.1 |

FOREIGN PATENT DOCUMENTS

| | | |
|---|---|---|
| JP | 2004-262412 A | 9/2004 |
| JP | 2004-288527 A | 10/2004 |
| JP | 2006-224874 A | 8/2006 |
| JP | 2008-260382 A | 10/2008 |
| WO | 2008/125946 A1 | 10/2008 |
| WO | 2012056492 A | 5/2012 |

* cited by examiner

VEHICLE

CROSS REFERENCE TO RELATED APPLICATIONS

This application is a National Stage of International Application No. PCT/JP2012/003245 filed May 17, 2012, the contents of all of which are incorporated herein by reference in their entirety.

TECHNICAL FIELD

The present invention relates to a vehicle which is mounted with an electric storage unit for outputting an energy for use in running of the vehicle and a blower for supplying the electric storage unit with air for temperature adjustment.

BACKGROUND ART

It is known that a rise in temperature of a battery deteriorates input/output characteristics of the battery. To avoid this, a battery mounted on a hybrid car or an electric car to supply power for running of such a vehicle is cooled by air for temperature adjustment. The air for temperature adjustment can be directed to the battery through an intake duct by driving a blower, for example. The blower may be disposed adjacently to the battery.

When an external force is applied to the blower disposed adjacently to the battery, the blower, particularly a blower motor, may collide with the battery. When a monitor unit for the battery is disposed between the battery and the blower, the blower motor may collide with the monitor unit.

PRIOR ART DOCUMENTS

Patent Documents

[Patent Document 1] Japanese Patent Laid-Open No. 2004-288527
[Patent Document 2] Japanese Patent Laid-Open No. 2006-224874
[Patent Document 3] Japanese Patent Laid-Open No. 2002-186101
[Patent Document 4] Japanese Patent Laid-Open No. 2004-262412
[Patent Document 5] Japanese Patent Laid-Open No. 2003-346759
[Patent Document 6] Japanese Patent Laid-Open No. 2008-260382

DISCLOSURE OF THE INVENTION

Problems to be Solved by the Invention

It is thus an object of the present invention to provide a technique capable of preventing a blower motor from colliding with a battery when an external force is applied to a blower disposed adjacently to the battery.

It is another object of the present invention to provide a technique capable of preventing a blower motor from colliding with a monitor unit for a battery disposed between the battery and an adjacent blower when an external force is applied to the blower.

Means for Solving the Problems

According to an aspect, the present invention provides a vehicle including an electric storage unit having a plurality of electric storage elements and outputting an energy for use in running of the vehicle, a blower disposed closer to the exterior of the body of the vehicle than the electric storage unit and supplying the electric storage unit with air for adjusting the temperature of the electric storage element, and a duct disposed between the electric storage unit and the blower and connected to the electric storage unit or the blower. The blower includes a blower motor forming a flow of the air to be supplied to the electric storage unit, and the duct has a collision avoiding portion guiding the blower motor in an up-down direction or a side direction of the electric storage unit when the blower motor is moved toward the electric storage unit upon application of an external force.

The collision avoiding portion has an upper end coming into contact with the blower motor when the blower motor is moved toward the electric storage unit upon application of the external force, and the upper end is formed to have a height lower than the center of the blower motor by a predetermined value. The predetermined value can be a value smaller than a radius of the blower motor.

The vehicle further includes a device disposed between the electric storage unit and the duct and used in controlling charge and discharge of the electric storage unit. The collision avoiding portion has an upper end coming into contact with the blower motor when the blower motor is moved toward the electric storage unit upon application of the external force, and the upper end is formed to have a height at which the distance between the upper end and an upper end of the device located above the upper end of the collision avoiding portion is less than the radius of the blower motor.

The electric storage unit can include a pair of end plates between which the plurality of electric storage elements arranged along a predetermined direction are sandwiched in the predetermined direction, and can further include a coupling member extending in the predetermined direction and having both ends connected to the pair of end plates. The vehicle further includes a protecting member protecting the device disposed on one of the end plates opposite to the blower. The protecting member has a protruding portion disposed on a wall portion opposite to the upper end of the device, the protruding portion being adjacent to the coupling member in the predetermined direction.

The collision avoiding portion is provided integrally with the duct by forming the duct in an outer shape protruding into a space between the electric storage unit and the blower.

The collision avoiding portion is a rib formed on the duct.

The vehicle further includes a case forming a flow path of the air on the periphery of the electric storage unit. The duct is an exhaust duct connected to an exhaust port of the flow path.

The plurality of electric storage elements are arranged along a predetermined direction, and the electric storage unit and the blower are arranged along the predetermined direction.

The electric storage unit is disposed in a space formed below a seat cushion.

Advantage of the Invention

According to the present invention, since the blower motor moved toward the electric storage unit upon application of the external force is guided in the up-down direction or the side direction of the electric storage unit by the duct disposed between the electric storage unit and the blower, the collision of the blower motor moved upon application of the external force with the electric storage unit can be prevented.

MODE FOR CARRYING OUT THE INVENTION

Preferred embodiments of the present invention will hereinafter be described.

Embodiment 1

Figure 1:
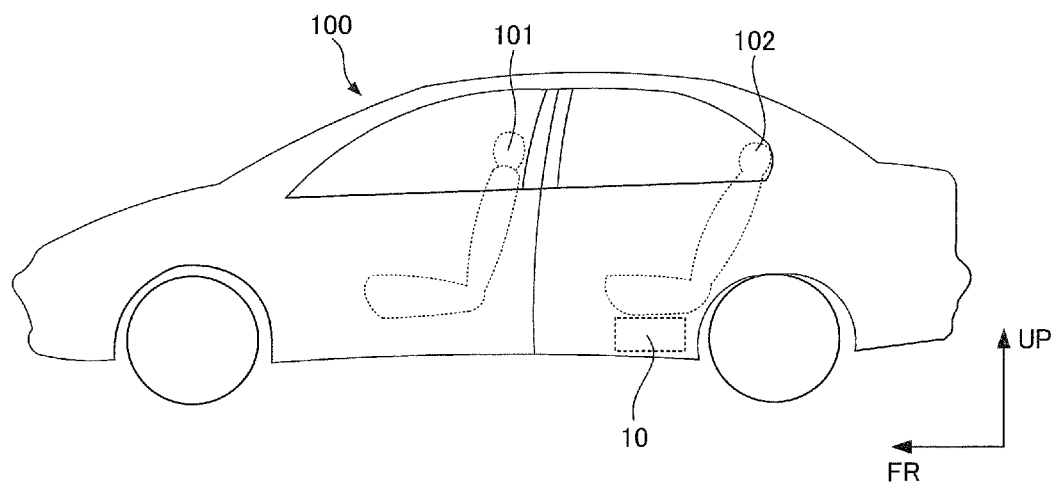
FIG. 1 A schematic diagram of a vehicle which is Embodiment 1.

FIG. 1 to FIG. 11 show Embodiment 1 of the present invention. FIG. 1 is a side view schematically showing a vehicle. In FIG. 1, an arrow FR indicates a forward direction of the vehicle, and an arrow UP indicates an upward direction of the vehicle.

A vehicle 100 has seats 101 and 102 in the interior thereof. The interior of the vehicle refers to the space where an occupant rides. The seat 101 is a driver's seat or a passenger's seat, for example. The seat 102 is a rear seat. The seats 101 and 102 are fixed to a floor panel of the vehicle 100. A battery pack 10 is disposed in the space formed below the seat 102 and is fixed to the floor panel. In other words, the battery pack 10 is disposed between a seat cushion of the seat 102 and the floor panel.

Although the battery pack 10 is disposed below the seat 102 in the present embodiment, the battery pack 10 may be disposed in a different space within the vehicle 100. For example, the battery pack 10 may be disposed below the seat 101 or the battery pack 10 may be disposed in a luggage space located at the back of the seat 102.

The battery pack 10 outputs an energy for use in running of the vehicle 100. Examples of the vehicle 100 include a hybrid car and an electric car. The hybrid car includes, as the power source for running of the vehicle 100, the battery pack 10 and another power source such as a fuel cell and an internal-combustion engine. The electric car includes only the battery pack 10 as the power source for the vehicle 100.

The battery pack 10 is connected to a motor generator. The motor generator can receive the power from the battery pack 10 to generate a kinetic energy for running of the vehicle 100. The motor generator is connected to wheels, and the kinetic energy generated by the motor generator is transferred to the wheels. For decelerating or stopping the vehicle 100, the motor generator converts a kinetic energy produced in braking of the vehicle into an electric energy. The electric energy generated by the motor generator can be stored in the battery pack 10.

A DC/DC converter and an inverter can be placed on a current path between the battery pack 10 and the motor generator. The DC/DC converter can be used to increase the voltage output from the battery pack 10 and supply the increased voltage to the motor generator and to reduce the voltage output from the motor generator and supply the reduced voltage to the battery pack 10. The inverter can be used to convert the DC power output from the battery pack 10 into an AC power, so that an AC motor can be used as the motor generator.

Figure 2:
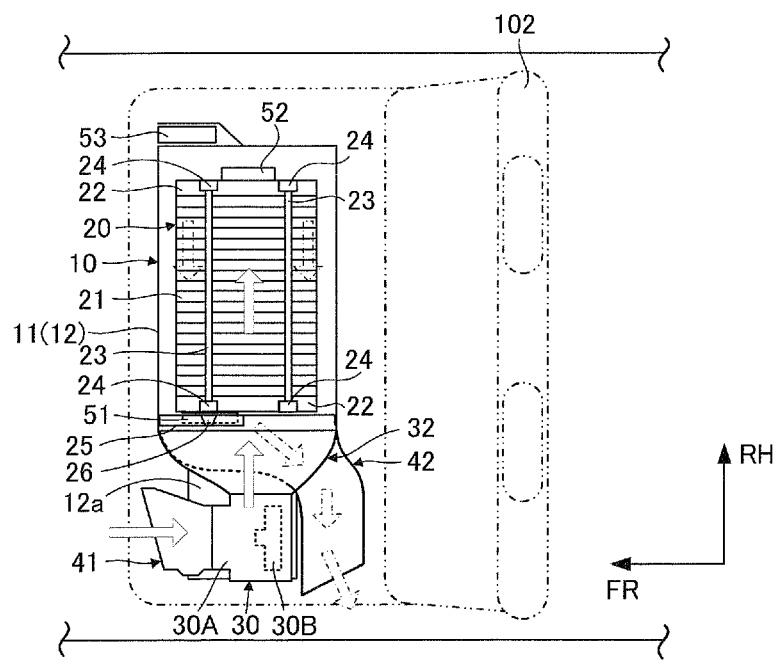
FIG. 2 A schematic top view of a battery pack and a blower in Embodiment 1.
Figure 3:
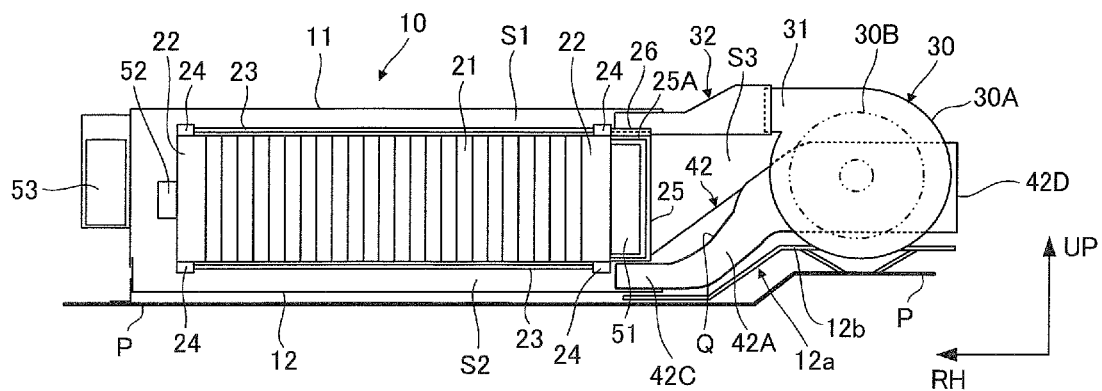
FIG. 3 A schematic side view of the battery pack and the blower in Embodiment 1.

Next, description is made of the battery pack 10 mounted on the vehicle 100 and a mechanism for supplying air for temperature adjustment to the battery pack 10 by using a blower 30. FIG. 2 is a schematic top view of the battery pack 10 and the blower 30 disposed below the seat 102. FIG. 3 is a schematic side view of the battery pack and the blower viewed from the FR direction in FIG. 2. An arrow RH indicates a lateral direction orthogonal to the forward direction FR of the vehicle 100.

The battery pack 10 has an upper case 11 and a lower case 12. A battery stack 20 is disposed in the space surrounded by the upper case 11 and the lower case 12. The battery stack 20 is fixed to the upper case 11 or the lower case 12. The lower case 12 is fixed to the floor panel P of the vehicle 100 to fix the battery stack 20 to the floor panel P. The battery pack 10 may be fixed to the floor panel P through a bracket.

The battery stack 20 corresponds to an electric storage unit of the present invention. The battery stack 20 has a plurality of cells 21 arranged along a predetermined direction (RH direction). The cell 21 corresponds to an electric storage element of the present invention. The plurality of cells 21 are connected electrically in serial through a bus bar. The battery stack 20 may include a plurality of cells 21 connected electrically in parallel.

A so-called square-type cell is used as the cell 21 in the present embodiment. The square-type cell 21 is a cell having planes orthogonal to the direction along which the plurality of cells 21 are arranged. A secondary battery such as a nickel metal hydride battery or a lithium-ion battery can be used as the cell 21. An electric double layer capacitor may be used instead of the secondary battery.

Although the plurality of cells 21 are arranged along one direction in the present embodiment, the present invention is not limited thereto. Specifically, two or more cells can constitute a battery module, and a plurality of such battery modules can be arranged along one direction (RH direction). The plurality of cells contained in the single battery module can be connected electrically in serial.

A pair of end plates 22 are disposed at both ends of the battery stack 20 in the direction (RH direction) along which the plurality of cells 21 are arranged. The pair of end plates 22 hold the plurality of cells 21 constituting the battery stack 20 between them and are used to apply a restraint force to the plurality of cells 21. The restraint force refers to a force which tightly holds the cells 21 in the RH direction. The restraint force applied to the cells 21 can suppress expansion of the cells 21 to prevent deterioration of input/output characteristics of the cells 21.

Specifically, both ends of a restraint band 23 extending in the RH direction are connected to the pair of end plates 22. The end plate 22 has a fixing portion 24 formed thereon to which the restraint band 23 is coupled. The end of the restraint band 23 is coupled to the fixing portion 24 to connect the restraint band 23 to the end plate 22.

This allows the pair of end plates 22 to apply the restraint force to the plurality of cells 21. The restraint band 23 is disposed on each of an upper face and a lower face of the battery stack 20. The position to dispose the restraint band 23 can be set as appropriate as long as both ends of the restraint band 23 are connected to the pair of end plates 22. For example, the restraint band 23 may be disposed on each of side faces of the battery stack 20 in the FR direction.

A spacer, not shown, can be disposed between adjacent two of the cells 21. The spacer is used to form a space between the two cells 21. The spacer can be made of an insulating material such as resin. The space formed by the spacer serves as the space through which the air for adjusting the temperature of the cell 21 moves.

In the present embodiment, an intake passage S1 is formed on the upper face of the battery stack 20, and an exhaust passage S2 is formed on the lower face of the battery stack 20. The intake passage S1 is formed by the upper face of the battery stack 20 and the upper case 11. The exhaust passage S2 is formed by the lower face of the battery stack 20 and the lower case 12.

A portion (hereinafter referred to as a base) 12a of the lower case 12 extends in the RH direction. The blower 30 is fixed to the base 12a. Thus, the battery pack 10 can be mounted on the vehicle 100 with the blower 30 attached to the base 12a (lower case 12). In other words, the battery pack 10 and the blower 30 can be handled as an integral unit and can be mounted easily on the vehicle 100.

The base 12a of the present embodiment has a blower attaching portion 12b located at a lower face of the blower 30 disposed adjacently to a side face of the battery stack 20 in the RH direction. The base 12a is bent upward from a lower face of the lower case 12 to the blower attaching portion 12b such that the blower attaching portion 12b is located above the lower face of the lower case 12. The base 12a may be provided as a member independent of the lower case 12 and may be connected to the lower case 12, or the base 12a may be formed integrally with the lower case 12.

The blower 30 is disposed adjacently to the side face of the battery stack 20 in the RH direction. In other words, the blower 30 is disposed adjacently in the direction along which the plurality of cells 21 of the battery stack 20 are arranged. For example as shown in FIG. 2, the blower 30 is disposed closer to the exterior of the body of the vehicle 100 (for example, closer to a side portion of the vehicle in the RH direction) than the battery stack 20 in the present embodiment.

An outflow port of the blower 30 is connected to an intake duct 32 through a duct 31. The intake duct 32 is disposed between the battery stack 20 and the blower 30 and is connected to the intake passage S1 of the battery pack 10. An intake duct 41 is connected to an inflow port of the blower 30. An intake port is provided at an end of the intake duct 41 connected to the blower 30. The intake port of the intake duct 41 is exposed to the interior of the vehicle.

The blower 30 has a housing portion 30A having the outflow port connected to the duct 31 and the inflow port connected to the intake duct 41 formed therein, and a blower motor 30B put in the housing portion 30A. The blower motor 30B is a circular motor which is driven to rotate with power supplied to the blower motor 30B. The blower motor 30B is connected to a runner which has a plurality of blades arranged in cylindrical form and elongated in a rotation axis direction. When the blower motor 30B is driven, air in the interior of the vehicle is taken into the blower 30 through the intake duct 41 and is introduced into the intake passage S1 of the battery pack 10 through the intake duct 32.

The blower motor 30B is disposed adjacently to the battery pack 10 such that the rotation axis direction of the blower motor 30B is generally in parallel with the FR direction of the battery pack 10. Specifically, the blower 30 is disposed adjacently to the side face of the battery pack 10 such that the rotation axis of the blower motor 30B extends in the direction generally perpendicular to the RH direction. In the present embodiment, as shown in FIG. 2, the intake duct 41 connected to the inflow port of the blower 30 is faced to a front side of the seat 102 in the FR direction. The blower 30B takes in the air in the interior of the vehicle from the FR direction generally in parallel with the rotation axis direction of the blower motor 30B, flows the air in the RH direction generally perpendicular to the rotation axis direction, and supplies the air taken from the interior of the vehicle to the intake duct 32 (battery pack 10).

The air in the interior of the vehicle taken through the intake duct 41 passes through the duct 31 of the blower 30 and the intake duct 32 into the intake passage S1. The air moved into the intake passage S1 enters the space formed by the spacer to move from the upper face to the lower face of the battery stack 20.

The air comes into contact with an outer face of the cell 21 to achieve heat exchange between the air and the cell 21. For example, when the cell 21 generates heat due to charge or discharge, air for cooling can be brought into contact with the cell 21 to suppress a rise in temperature of the cell 21. When the cell 21 is extremely cooled, air for heating can be brought into contact with the cell 21 to suppress a drop in temperature of the cell 21.

The air in the interior of the vehicle has a temperature set appropriately for adjusting the temperature of the cell 21 by an air-conditioner or the like mounted on the vehicle 100. Thus, the air in the interior of the vehicle can be supplied to the cell 21 to perform the temperature adjustment for the cell 21. The adjustment of the temperature of the cell 21 can reduce deterioration of input/output characteristics of the cell 21.

The air after the heat exchange with the cell 21 moves into the exhaust passage S2. Since an exhaust duct 42 is connected to the exhaust passage S2, the air moved into the exhaust passage S2 is directed to the exhaust duct 42. The exhaust duct 42 exhausts the air to the outside of the battery pack 10. For example, the exhaust duct 42 can let out the air to the interior of the vehicle. In FIG. 2, arrows indicated by solid lines represent an intake path, and arrows indicated by chain lines represent an exhaust path.

The exhaust duct 42 can be disposed in a space S3 between the battery pack 10 and the blower 30 attached to the base 12a. For example, the exhaust duct 42 is formed to have a duct portion 42A partially disposed in the space S3 between the blower 30 and the battery pack 10, and the exhaust duct 42 extends toward the back of the blower 30. An end of the exhaust duct 42 (outlet port of the duct portion 42A) can be connected, for example to a garnish located in the lateral direction of the vehicle 100. The air moved through the exhaust duct 42 is returned to the interior of the vehicle through the garnish. The exhaust duct 42 can be disposed such that the outlet port is located in the space between the luggage space or the seat 102 and a side face of the vehicle 100, for example.

The exhaust duct 42 in the present embodiment is formed in a shape in which the duct portion 42A disposed in the space S3 guides the blower motor 30B to an upper face of the battery pack 10 when an external force is applied to the blower 30 to move the blower motor 30B toward the battery pack 10.

For example, the duct portion 42A can be formed to have a duct shape with its height increased in the UP direction from a connecting port 42C connected to an exhaust port of the exhaust passage S2 of the battery pack 10 toward the blower 30. Specifically, the duct portion 42A is formed such that an upper edge Q of the duct portion 42A disposed in the space S3 is at a height (for example, a height in the UP direction relative to the floor panel P or the lower face of the battery stack 20) higher than that of the connecting port 42C located below to provide the shape inclined from the connecting portion 42C to the duct portion 42A.

A monitor unit 51 is disposed between the battery stack 20 and the blower 30 (between the battery stack 20 and the duct portion 42A). The monitor unit 51 monitors the voltage and the current of the battery stack 20. Specifically, a plurality of voltage sensors are attached to the battery stack 20, and the result of the detection by each of the voltage sensors is output to the monitor unit 51. The voltage sensor can detect the voltage of each cell 21. When the plurality of cells 21 constituting the battery stack 20 are divided into a plurality of blocks, the voltage sensor can detect the voltage of each of the blocks. Each block is formed of a plurality of cells 21. A current sensor is attached to the battery stack 20, and the result of the detection by the current sensor is output to the monitor unit 51.

The information monitored by the monitor unit 51 is used to control the charge and discharge of the battery stack 20. For example, when the voltage value (detection value) of the cell 21 reaches a preset upper limit value, the charge and discharge of the battery stack 20 can be inhibited or limited. The limitation of the charge and discharge of the battery stack 20 can involve changing an upper limit value of power used in control of charge and discharge to a lower value.

A relay 52 is disposed on the side of the battery stack 20 opposite to the side where the monitor unit 51 is disposed. In other words, the monitor unit 51 and the relay 52 can be disposed on both side faces of the battery stack 20 in the RH direction. While the relay 52 is ON, the charge and discharge of the battery stack 20 are allowed. While the relay 52 is OFF, the charge or discharge of the battery stack 20 are inhibited.

A current breaker 53 is used to break a current path in the battery pack 10. The current breaker 53 can be formed of a plug and a grip to be inserted into the plug. The grip can be withdrawn from the plug to break the current path. The current breaker 53 can be disposed on the side face of the battery stack 20 on which the relay 52 is disposed.

The monitor unit 51 can be attached to the end plate 22 for the battery stack 20. A protecting member 25 provides a space for housing the monitor unit 51 and is formed to have a predetermined thickness. The protecting member 25 protects the monitor unit 51 attached to the end plate 22 from the external force applied to the monitor unit 51. The protecting member 25 disposed to cover the monitor unit 51 on the side face of the end plate 22 in the RH direction is connected to the upper case 11 or the end plate 22. The protecting member 25 may be connected to the end plate 22 similarly to the monitor unit 51.

The protecting member 25 has a protruding portion 26 located at the restraint band 23 connected to the end plate 22 or at the fixing portion 24 to which the restraint band 23 is coupled while the protecting member 25 is attached to the battery pack 10. The protruding portion 26 is disposed on a wall portion 25A forming the space for housing the monitor unit 51. The protruding portion 26 is disposed adjacently to the restraint band 23 in the direction along which the plurality of cell 21 are arranged. An end portion of the protruding portion 26 may be in contact with the restraint band 23 or the fixing portion 24, or the protruding portion 26 may be disposed flush with the restraint band 23 or the fixing portion 24 at a predetermined interval between them.

The protruding portion 26 can be formed, for example, by protruding part of the wall portion 25A of plate shape located above the monitor unit 51 in the UP direction through squeezing. The protruding portion 26 serves as a reinforcement portion for the protecting member 25 against the external force applied in the RH direction. For example, when the wall portion 25A receives the external force in the RH direction, the protruding portion 26 comes into contact with the restraint band 23 or the fixing portion 24 to suppress deformation of the wall portion 25A. The protruding portion 26 prevents the space for housing the monitor unit 51 from being narrowed due to deformation of the wall portion 25A.

Although the present embodiment illustrates an aspect in which the protruding portion 26 is formed integrally with the protecting member 25, the present invention is not limited thereto, and the protruding portion 26 may be formed separately and attached to the wall portion 25A. The protruding portion 26 may be formed to come into contact with the end plate 22 instead of the fixing portion 24 when the external force is applied. In other words, the protruding portion 26 may be disposed on the protecting member 25 such that the protruding portion 26 is located at the end plate 22 while it is attached to the battery pack 10.

Figure 4:
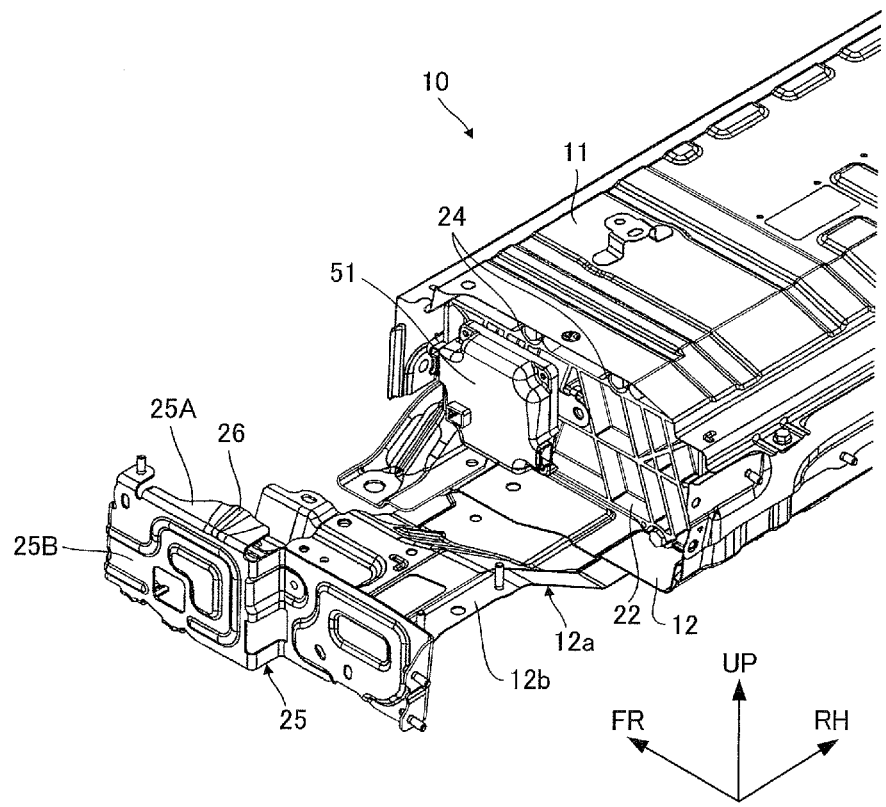
FIG. 4 An external perspective view of a monitor unit disposed on the battery pack and a protecting member for the monitor unit in Embodiment 1.
Figure 5:
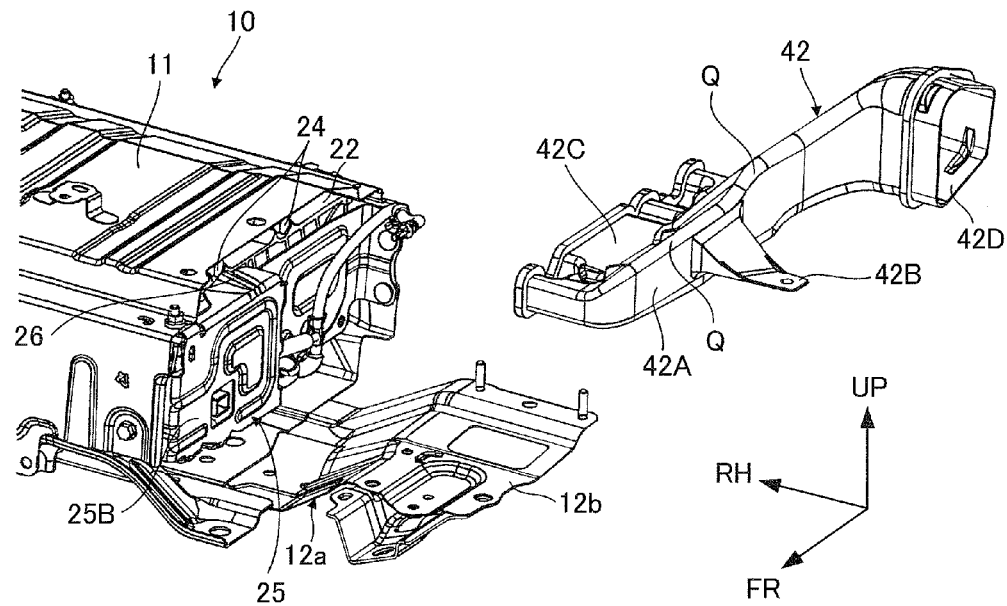
FIG. 5 An external perspective view of the battery pack and an exhaust duct in Embodiment 1.
Figure 6:
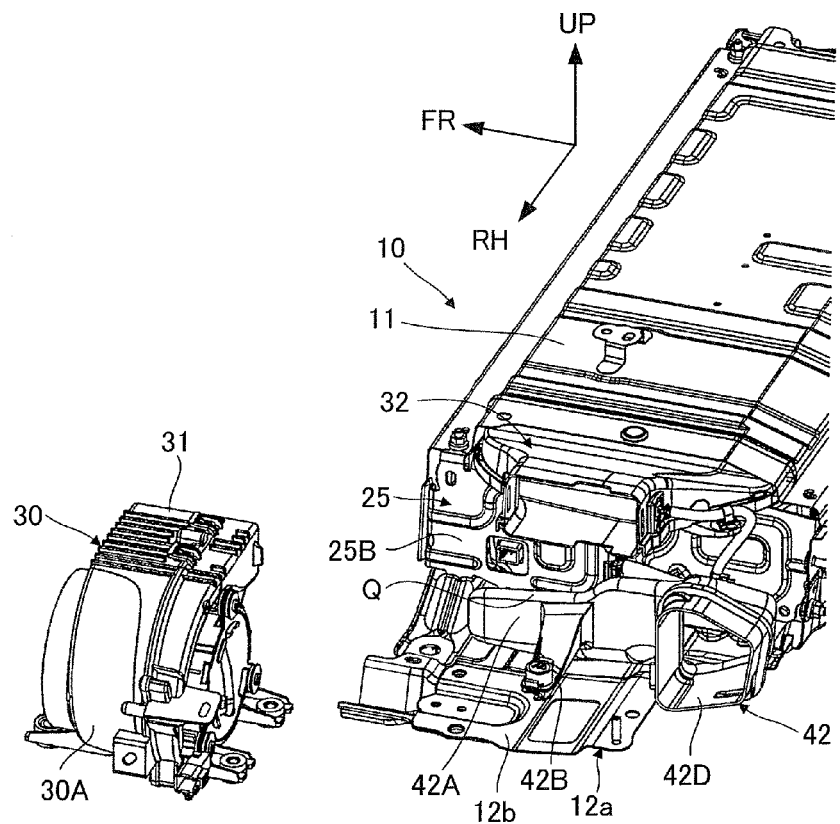
FIG. 6 An external perspective view of the battery pack and a blower in Embodiment 1.

FIG. 4 is an external perspective view of the monitor unit 51 disposed on the battery pack 10 and the protecting member 25 for protecting the monitor unit 51. FIG. 5 is an external perspective view of the battery pack 10 and the exhaust duct 42. FIG. 6 is an external perspective view of the battery pack 10 and the blower 30.

As shown in FIG. 4, the monitor unit 51 can be attached to the end plate 22 of the battery stack 20. The protecting member 25 is attached to cover the monitor unit 51 attached to the end plate 22 in the RH direction. The protecting member 25 can be formed of a single plate-shaped member. Part of the wall portion (wall portion 25B) associated with the monitor unit 51 is formed in a recessed shape to provide the space for housing the monitor unit 51 between the wall portion and the end plate 22. Although the protecting member 25 of the present embodiment is formed to have a size which covers the entire outer face of the end plate 22, the protecting member 25 may be sized to cover only the monitor unit 51, for example.

As shown in FIG. 5, the duct portion 42A of the exhaust duct 42 is shaped to have the height increased in the UP direction from the connecting port 42C attached to the exhaust port of the exhaust passage S2 of the battery pack 10 toward the blower 30. The upper edge Q of the duct portion 42A is located above an upper face of the duct connecting port 42C. The duct portion 42A is provided with a fixing portion 42B connected to the base 12a. The duct portion 42A is shaped to be bent in the FR direction and then extend toward the back of the blower 30 to avoid the blower 30 disposed adjacently to the battery pack 10 in the RH direction. For example, when viewed from the top of the battery pack 10, an outlet port 42D of the exhaust duct 42 is disposed adjacently to the blower 30 in the FR direction.

Although the present embodiment includes the duct portion 42A shaped to be inclined steeply in the UP direction from the connecting port 42C toward the blower 30, the present invention is not limited thereto. For example, the duct portion 42A may have a rectangular shape or an arc shape having the upper edge Q above the connecting port 42C in the UP direction with no inclination of the upper edge Q. In addition, the duct portion 42A disposed in the space S3 may be shaped independently of the shape of the air flow path formed by the duct portion 42A. Thus, the duct portion 42A may provide the air flow path conforming to the shape protruding in the UP direction within the space S3 or provide the air flow path independently of the shape protruding in the UP direction.

As shown in FIG. 6, the intake duct 32 is connected to the intake passage S1 of the battery pack 10, and the exhaust duct 42 is connected to the exhaust passage S2 communicating with the intake passage S1 of the battery pack. The duct 31 of the blower 30 is connected to the intake duct 32, and the blower 30 is fixed to the blower attaching portion 12b of the base 12a. The inflow port of the blower 30 is connected to the intake duct 41.

Figure 7:
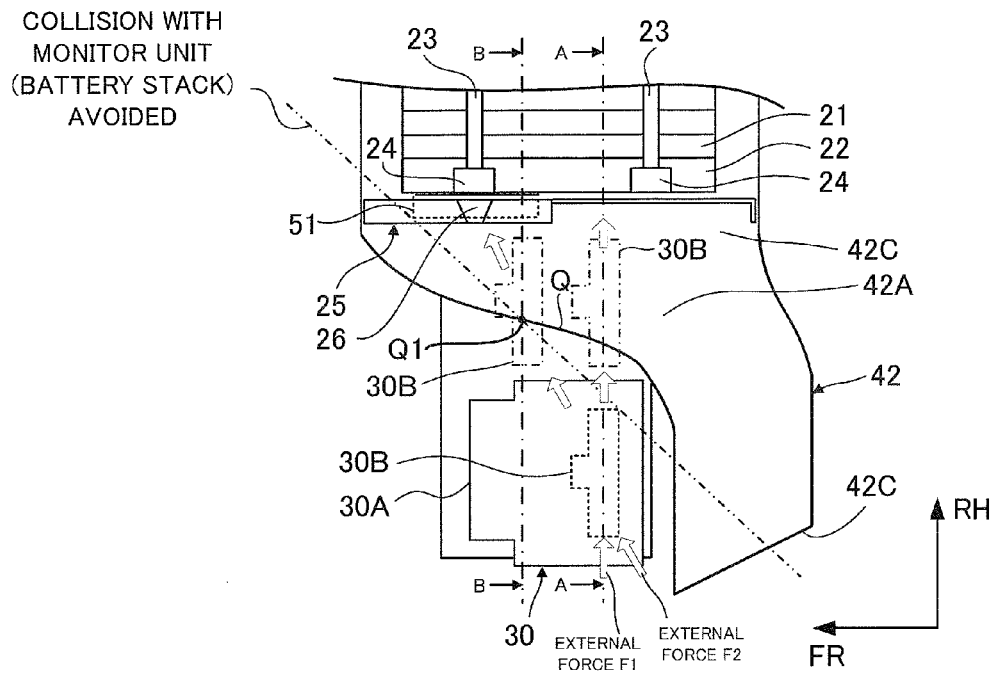
FIG. 7 A top view showing the positional relationship between the battery pack and an adjacently disposed blower motor and the movement track of the blower when an external force is applied thereto in Embodiment 1.

Next, description is made of the specific structures of the exhaust duct 42 disposed between the battery stack 20 and the blower 30 and of the blower 30. FIG. 7 is a top view showing the positional relationship between the battery stack 20 and the adjacently disposed blower motor 30B and the movement track of the blower motor 30B when the external force is applied to the blower 30.

As shown in FIG. 7, when the external force (the force acting in a left-right direction of the vehicle 100) is applied to the blower 30, the blower 30 facing the side face of the battery stack 20 in the RH direction and disposed on the base 12a may collide with the battery stack 20 (battery pack 10). Particularly, since the blower motor 30B of the blower 30 is a metallic member made of iron or the like and is harder than the housing portion 30A made of synthetic resin or the like, the external force applied to the blower 30 may cause the blower motor 30B to move toward and collide with the adjacent battery stack 20.

For example, when an external force F is applied to a side door of the vehicle 100, the side door or the floor panel P is deformed to bring the side door closer to the blower 30. Since the blower 30 is disposed closer to the side door than the battery stack 20, the external force F may act on the blower 30 through the side door.

An external force F1 is an external force acting on the blower 30 generally in parallel with the RH direction. When the external force F1 is applied to the blower 30, the blower motor 30B is moved toward the battery stack 20 generally in parallel with the RH direction. An external force F2 is an external force acting on the blower 30 obliquely to the RH direction from the back of the vehicle 100. When the external force F2 is applied to the blower 30, the blower motor 30B is moved toward the battery stack 20 obliquely to the RH direction.

In terms of avoiding the collision of the blower motor 30B with the battery stack 20, it is also important to prevent the blower 30 from colliding with the monitor unit 51 disposed between the blower 30 and the battery stack 20. Upon collision of the blower motor 30B with the battery stack 20, the blower motor 30B may also collide with the monitor unit 51 disposed between the blower 30 and the battery stack 20.

For example, when the blower motor 30B receives the external force F1 to collide with the battery pack 10 as shown in FIG. 7, the collision with the monitor unit 51 can be avoided by offsetting the blower motor 30B from the monitor unit 51 in the FR direction. However, when the external force F2 moves the blower motor 30B obliquely to the RH direction toward the side face of the battery stack 20, the blower motor 30B may move to and collide with the monitor unit 51 even when the monitor unit 51 is offset.

Since the protecting member 25 is provided for the monitor unit 51 disposed on the side face of the battery stack 20 between the battery stack 20 and the blower 30, the monitor unit 51 is protected by the protecting member 25 to some extent even when the blower motor 30B collides with the side face of the battery stack 20. However, the wall portion 25B of the protecting member 25 located between the monitor unit 51 and the blower 30 is struck on the surface with the blower motor 30B, so that an increased strength against the shock obtained by increasing the thickness of the protecting member 25 has a limited effect. Thus, when the blower motor 30B collides with the protecting member 25, the space for housing the monitor unit 51 may be dented to prevent the protecting member 25 from sufficiently protecting the monitor unit 51.

As described above, the monitor unit 51 monitors the voltage and the current of the battery stack 20, and a high-voltage wire or the like may be connected thereto. The monitor unit 51 requires protection similarly to the battery stack 20 from the blower motor 30B moved when the external force F2 is applied.

To achieve this, in the present embodiment, the exhaust duct 42 disposed in the space S3 between the side face of the battery stack 20 and the blower 30 is appropriately shaped to provide a collision avoiding portion for guiding the movement track of the blower motor 30B toward the upper face of the battery stack 20 when the blower motor 30B is moved toward the battery stack 20 upon application of the external force F1 or the external force F2. In the present embodiment, the outer shape of the duct portion 42A of the exhaust duct 42 disposed in the space S3 is formed to protrude in the UP direction to provide the duct portion 42A integral with the collision avoiding portion.

The present embodiment prevents the blower motor 30B from colliding with the battery stack 20 and prevents the collision between the blower motor 30B and the monitor unit 51 disposed between the battery stack 20 and the blower 30 (duct portion 42A).

Figure 8:
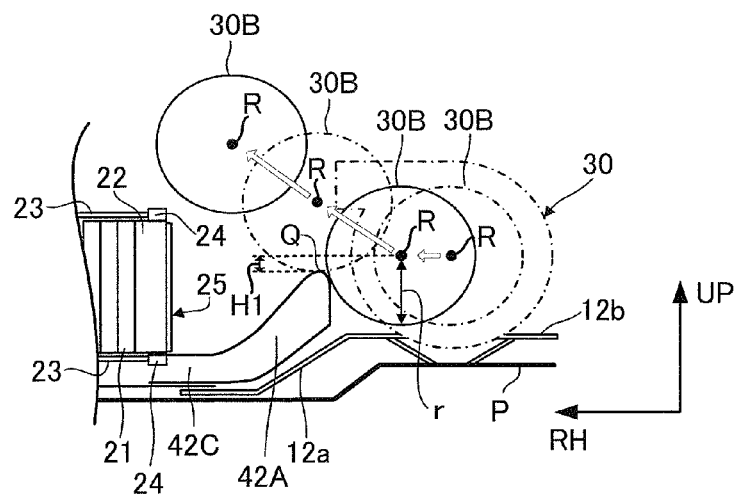
FIG. 8 A side view showing the movement track of the blower when an external force F1 is applied thereto in a cross section taken along line A-A in FIG. 7.

First, description is made of the exhaust duct 42 in the present embodiment capable of preventing the blower motor 30B from colliding with the battery stack 20. FIG. 8 is a side view showing the movement track of the blower motor 30B when the external force F1 is applied thereto in a cross section taken along line A-A in FIG. 7.

In the exhaust duct 42 of the present embodiment, the upper edge Q of the duct portion 42A disposed in the space S3 is formed to protrude in the UP direction. Specifically, the upper edge Q of the duct portion 42A is formed at the height in contact with a circumferential face of the blower motor 30B during the movement of the blower motor 30B in the RH direction toward the side face of the battery stack 20 upon application of the external force.

When the blower motor 30B is moved in the RH direction toward the battery stack 20 upon application of the external force F1, the blower motor 30B comes into contact with the upper edge Q of the duct portion 42A and is prevented from moving generally perpendicularly to the side face of the battery stack 20. The movement of the blower motor 30B generally perpendicular to the side face of the battery stack 20 is guided toward the upper face of the battery stack 20. In this manner, the shape of the exhaust duct 42 (duct portion 42A) is appropriately formed to prevent the collision of the blower motor 30B with the battery stack 20 without requiring any additional component.

The height of the upper edge Q of the duct portion 42A is lower than a center R (rotation axis) of the blower motor 30B by a predetermined value in the UP direction. Specifically, the upper edge Q of the duct portion 42A is formed at the height lower than the position of the center R of the blower motor 30B in the UP direction relative to the floor panel P or the lower face of the battery stack 20 by a predetermined value H1, and the duct portion 42A and the center R of the blower motor 30B are separated from each other in the UP direction at the distance of the predetermined value H1.

The predetermined value H1 can be a value smaller than a radius r of the blower motor 30B. With the predetermined value H1 smaller than the radius r of the blower motor 30B, the shock to the duct portion 42A upon contact with the blower motor 30B can be dispersed, and the upper edge Q of the duct portion 42A can serve as a springboard to cause the movement of the blower motor 30B generally perpendicular to the side face of the battery stack 20 to be guided toward the upper face of the battery stack 20, although the duct portion 42A has no guide face for guiding the blower motor 30B toward the upper face of the battery stack 20. The predetermined value H1 can be set as appropriate in view of an angle at which the blower motor 30B is moved toward the upper face of the battery stack 20 without colliding with the battery stack 20 after the contact with the upper edge Q of the duct portion 42A.

Figure 9:
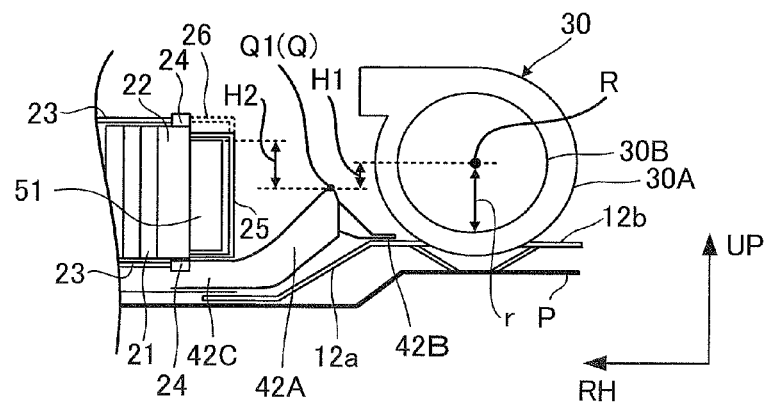
FIG. 9 A side view showing the positional relationship between the center of the blower motor and the exhaust duct and the positional relationship between the center of the blower motor and the protecting member for the monitor unit in a cross section taken along line B-B in FIG. 7.
Figure 10:
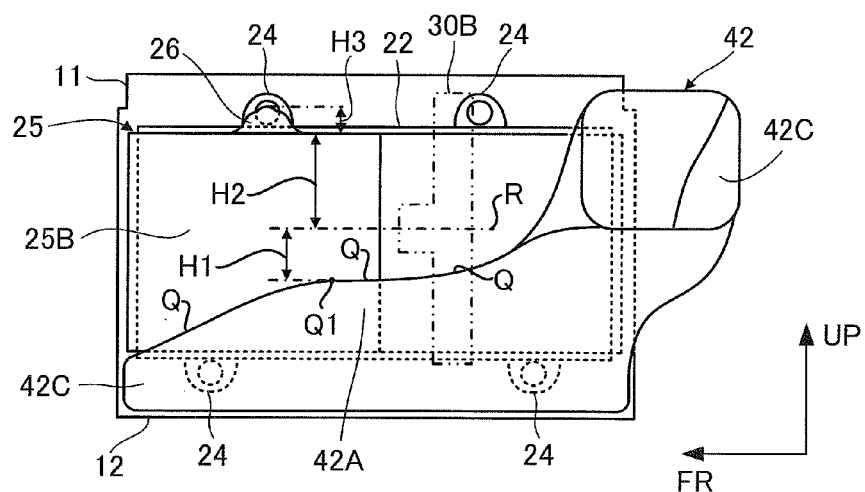
FIG. 10 A side view showing the positional relationship between the center of the blower motor and the exhaust duct and the positional relationship between the center of the blower motor and the protecting member for the monitor unit.
Figure 11:
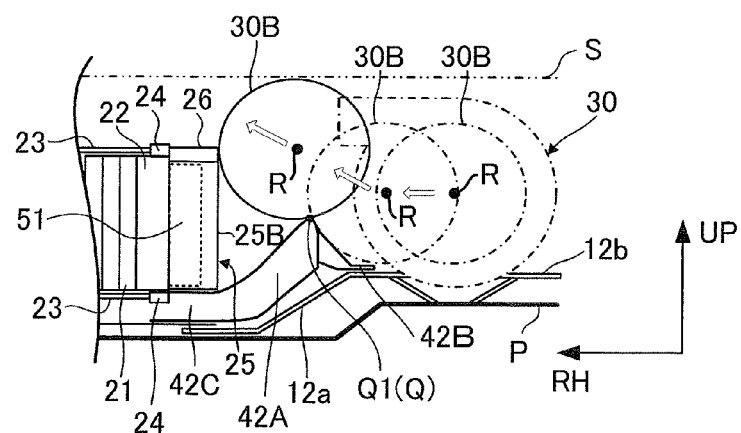
FIG. 11 A side view showing the movement track of the blower when an external force F2 is applied thereto in FIG. 9.

Next, description is made of the exhaust duct 42 allowing the avoidance of the collision of the monitor unit 51 disposed between the battery stack 20 and the blower 30 (duct portion 42A) with the blower motor 30B. FIG. 9 is a side view showing the positional relationship between the center R of the blower motor 30B and the exhaust duct 42 and the positional relationship between the center R of the blower motor 30B and the protecting member 25 for the monitor unit 51 in a cross section taken along line B-B in FIG. 7. FIG. 10 is a diagram showing the positional relationship between the exhaust duct 42 and the center R of the blower motor 30B on the side face of the battery stack 20 on which the monitor unit 51 is disposed when viewed from the RH direction and the positional relationship between the center R of the blower motor 30B and the protecting member 25 in which the monitor unit 51 is disposed. FIG. 11 is a diagram showing the movement track of the blower motor 30B when the external force F2 is applied thereto.

As shown in FIG. 7, when the external force F2 is applied to the blower motor 30B, the blower motor 30B offset from the monitor unit 51 rearward in the FR direction is moved obliquely to the RH direction toward the side face of the battery stack 20. Thus, the blower motor 30B may collide with the monitor unit 51 disposed on the outer face of the end plate 22 between the battery stack 20 and the blower 30.

In the present embodiment, to avoid the collision of the blower motor 30B with the monitor unit 51, in other words, the collision of the blower motor 30B with the side wall portion 25B of the protecting member 25 housing the monitor unit 51, the upper edge Q of the duct portion 42 can be formed at the height in contact with the blower motor 30B during the movement of the blower motor 30B in the RH direction toward the side face of the battery stack 20 upon application of the external force.

The upper edge Q of the duct portion 42A is shaped to have the height defined by the positional relationship with an upper end (wall portion 25A) of the monitor unit 51. If the upper edge Q of the duct portion 42 is located at a distance larger than the radius r of the blower motor 30B from the upper end in the UP direction of the monitor unit 51 disposed on the battery stack 20, the blower motor 30B moved generally perpendicularly to the side face of the battery stack 20 collides with the wall portion 25B to prevent sufficient protection of the monitor unit 51. Thus, the height of the upper edge Q of the duct portion 42A is defined such that the distance in the UP direction between the upper edge Q of the duct portion 42A disposed in the space S3 and the upper end of the monitor unit 51 relative to the floor panel P or the battery stack 20 has a predetermined value H2 less than the radius r of the blower motor 30B. The duct portion 42A is shaped such that the upper edge Q of the duct portion 42A defined in this manner is located to protrude between the battery stack 20 and the blower 30.

In other words, the upper edge Q of the duct portion 42A can be formed at the height to protrude between the battery stack 20 and the blower 30 such that the height of the upper end of the monitor unit 51 is lower than the height provided by adding the height of the upper edge Q of the duct portion 42A to the radius r of the blower motor 30B.

The upper edge Q of the duct portion 42A can be formed to have the height to protrude between the battery stack 20 and the blower 30 such that the height of the upper end of the monitor unit 51 is lower than the height provided by adding the height of the upper edge Q of the duct portion 42A to the radius r of the blower motor 30B. Consequently, the blower motor 30B comes into contact with the upper edge Q of the duct portion 42A to prevent the movement generally perpendicular to the monitor unit 51 (the side face of the battery stack 20). The movement of the blower motor 30B generally perpendicular to the side face of the monitor unit 51 is guided toward the upper face of the battery stack 20. As shown in FIG. 11, the shape of the exhaust duct 42 (duct portion 42A) is appropriately formed to avoid the collision of the blower motor 30B with the wall portion 25B without requiring any additional component.

As shown in FIG. 11, the blower motor 30B may come into contact with the wall portion 25A of the protecting member 25 housing the monitor unit 51. Particularly, when the battery stack 20 and the blower 30 are disposed under the seat 102 and over the floor panel P, the height of the upper edge Q of the duct portion 42A defined by the relationship with the height of the upper end of the monitor unit 51 can avoid the collision of the blower motor 30B with the wall portion 25B, but the movement of the blower motor 30B toward the upper face of the battery stack 20 may be blocked by a lower face S of the seat 102 to cause the blower motor 30B to collide with the protecting member 25, that is, the wall portion 25A disposed on the upper end of the monitor unit 51.

In the present embodiment, however, the protruding portion 26 is formed on the wall portion 25A. The protruding portion 26 serves as the reinforcement portion against the shock to the wall portion 25A and can suppress deformation of the wall portion 25A due to the collision of the blower motor 30B to protect the monitor unit 51.

As shown in FIG. 10, the protruding portion 26 is provided on the wall portion 25A disposed on the upper end of the monitor unit 51 and is formed to protrude upward from the wall portion 25A by a predetermined height H3. The predetermined height H3 corresponds to a height from the wall portion 25A to the restraint band 23 or the fixing portion 24, and the protruding portion 26 is disposed at the restraint band 23 connected to the end plate 22 or at the fixing portion 24 to which the restraint band 23 is coupled. As shown in FIG. 11, when the blower motor 30B comes into contact with the wall portion 25A, the protruding portion 26 can come into contact with the restraint band 23 or the fixing portion 24 to suppress the deformation of the wall portion 25A to prevent the space housing the monitor unit 51 from being narrowed due to the deformation of the wall portion 25A.

When the blower motor 30B collides with the side face of the battery stack 20 outside the area where the monitor unit 51 is disposed, the battery stack 20 can be protected from the collision of the blower motor 30B, for example by forming the end plate 22 to have a strength which can withstand the shock of the collision of the blower motor 30B. However, in the area where the monitor unit 51 is disposed, the monitor unit 51 cannot be protected sufficiently by enhancing the strength of the protecting member 25, so that the upper edge Q of the duct portion 42A is formed at the height to protrude between the battery stack 20 and the blower 30 such that the height of the upper end of the monitor unit 51 is lower than the height provided by adding the height of the upper edge Q of the duct portion 42A to the radius r of the blower motor 30B, thereby avoiding the collision of the motor blower 30B with the wall portion 25B to protect the monitor unit 51 properly.

In the exhaust duct 42 of the present embodiment, the upper edge Q of the duct portion 42A is formed at the height to protrude between the battery stack 20 and the blower 30 such that the upper edge Q of the duct portion 42 is at the height lower than the center R of the blower motor 30B in the UP direction by the predetermined value less than the radius r of the blower motor 30B, and that the height of the upper end of the monitor unit 51 is lower than the height provided by adding the height of the upper edge Q of the duct portion 42A to the radius r of the blower motor 30B. This can prevent the collision of the blower motor 30B with the side face of the battery stack 20 and with the monitor unit 51 disposed on the side face of the battery stack 20.

As shown in FIG. 7, when the blower 30 (blower motor 30B) is located rearward of the monitor unit 51 in the FR direction, and the angle at which the blower motor 30B is moved obliquely to the RH direction by the external force F2 is larger than an angle indicated by a chain double-dashed line in FIG. 7, then the blower motor 30B deviates from the side face of the battery stack 20 and thus does not collide. In this case, in the area rearward of the position indicated by a symbol Q1 in the FR direction relative to the monitor unit 51, the upper edge Q of the duct portion 42A is formed at the height to protrude between the battery stack 20 and the blower 30 such that the upper edge Q of the duct portion 42A is at the height lower than the center R of the blower motor 30B in the UP direction by the predetermined value less than the radius r of the blower motor 30B and/or that the height of the upper edge of the monitor unit 51 is lower than the height provided by adding the height of the upper edge Q of the duct portion 42A to the radius r of the blower motor 30B, thereby allowing the prevention of the collision of the blower motor 30B with the side face of the battery stack 20 and with the monitor unit 51 disposed on the side face of the battery stack 20. In other words, the upper edge Q of the duct portion 42A disposed in the area less close to the blower motor 30B and forward of the position indicated by the symbol Q1 in the FR direction relative to the monitor unit 51 may have a shape which does not satisfy the positional relationships defined by the predetermine values H1 and H2 for the center R of the blower motor 30B and the upper end of the monitor unit 51.

Figure 12:
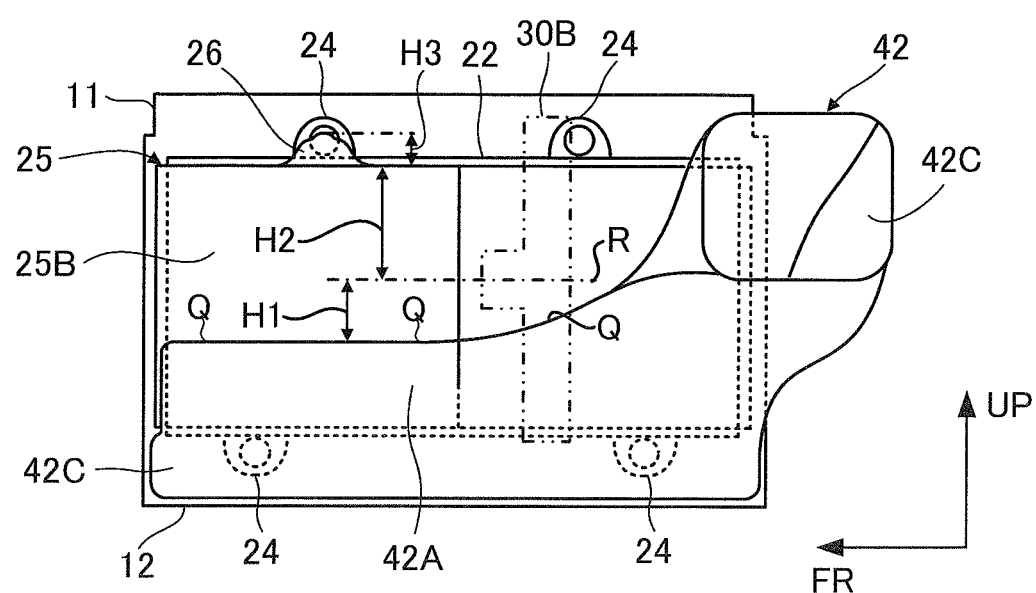
FIG. 12 A schematic side view showing a variation of the exhaust duct in Embodiment 1.

Regardless of the positional relationship between the blower 30 (blower motor 30B) and the monitor unit 51 in the FR direction, as shown in FIG. 12, the entire upper edge Q of the duct portion 42 disposed in the space S3 between the side face of the battery stack 20 and the blower 30 may have a shape which satisfies the positional relationships defined by the predetermine values H1 and H2 for the center R of the blower motor 30B and the upper end of the monitor unit 51.

Although the present embodiment includes the intake passage S1 provided on the upper face side of the battery stack 20 and the exhaust passage S2 provided on the lower face side of the battery stack 20, the present invention is not limited thereto. Specifically, the intake passage and the exhaust passage may be provided at positions between which the battery stack 20 is sandwiched. For example, the exhaust passage can be provided on the upper face side of the battery stack 20 and the intake passage can be provided on the lower face side of the battery stack 20. In this case, the duct portion 42A of the exhaust duct 42 connected to the exhaust passage and disposed in the space S3 can guide the blower motor 30B toward the lower face of the battery stack 20 to prevent the collision between the blower motor 30B and the battery stack 20 and the collision between the blower motor 30B and the monitor unit 51 as described above.

Although the present embodiment includes the collision avoiding portion provided for the exhaust duct 42 disposed between the battery stack 20 and the blower 30 (blower motor 30B), the present invention is not limited thereto. For example, the collision avoiding portion may be provided for the intake duct 32. For example, when the exhaust passage is provided on the upper face side of the battery stack 20 and the intake passage is provided on the lower face side of the battery stack 20, the intake duct 32 can be formed to have a shape similar to that of the duct portion 42A to guide the blower motor 30B toward the upper face of the battery stack 20 to prevent the collision between the blower motor 30B and the battery stack 20 (monitor unit 51).

Although the present embodiment includes the monitor unit 51 disposed between the battery stack 20 and the blower 30, the present invention is not limited thereto. In the space S3 formed between the battery stack 20 and the blower 30, a device used to control the charge and discharge of the battery stack 20 can be disposed instead of or in addition to the monitor unit 51. Examples of the device include a relay 52, a voltage sensor, a current sensor, and a temperature sensor, in addition to the monitor unit 51. The temperature sensor is used to detect the temperature of the battery stack 20, and the result of the detection by the temperature sensor is used to control the charge and discharge of the battery stack 20. In this case, the collision of the blower motor 30B with the device disposed between the battery stack 20 and the blower 30 can also be avoided.

Although the present embodiment includes the monitor unit 51 disposed at the left of the end plate 22 in FIG. 7 by way of example, the present invention is not limited thereto. For example, the monitor unit 51 can be disposed at the center or at the right of the end plate 22 in the FR direction. In this case, the protecting member 25 forms the space for housing the monitor unit 51 in association with the position of the monitor unit 51 disposed on the end plate 22.

Embodiment 2

Figure 13:
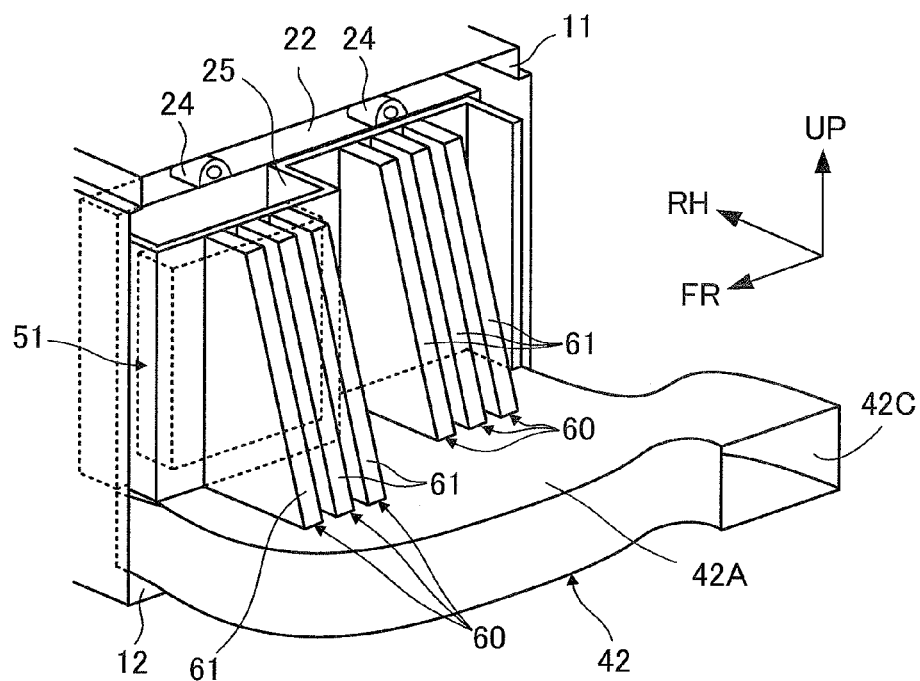
FIG. 13 An external perspective view of an exhaust duct provided with ribs (guide member) in Embodiment 2.

Embodiment 2 of the present invention will be described with reference to FIG. 13 and FIG. 14. FIG. 13 is an external perspective view of an exhaust duct 42 provided with ribs (guide member) 60. Members having the functions identical to those described in Embodiment 1 are designated with the same reference numerals, and detailed description thereof is omitted. The following description is mainly focused on differences from Embodiment 1.

Embodiment 1 includes the duct portion 42A of the exhaust duct 42 shaped to have the height increased in the UP direction within the space S3 between the battery pack 10 and the blower 30. In the present embodiment, a duct portion 42A is formed to have an upper end face of flat shape (as a plane), and a plurality of ribs 60 protruding in the UP direction and having guide faces 61 are formed on the upper end face of the duct portion 42A. The ribs 60 guide a blower motor 30B toward an upper face or a lower face of a battery stack 20 when the blower motor 30B is moved by an external force F1 or an external force F2 applied thereto.

The ribs 60 are disposed between a side face of the battery stack 20 and a blower 30. The rib 60 is formed in a trapezoidal shape extending from the upper end face of the duct portion 42A toward the upper face of the battery stack 20. The guide faces 61 are opposite to the blower 30 disposed adjacently to the battery stack 20 in the RH direction and is inclined toward the side face of the battery stack 20. The guide face 61 inclined from the lower face toward the upper face of the battery stack 20 guides the blower motor 30B toward the upper face of the battery stack 20 when the blower motor 30B is moved toward the side face of the battery stack 20 upon application of the external force.

As shown in FIG. 13, the plurality of ribs 60 are arranged at predetermined intervals along the FR direction of the battery stack 20 such that the guide faces 61 face the blower 30. The plurality of ribs 60 may be formed of a single rib. For example, the rib having the guide face 61 wide in the FR direction of the battery stack 20 may be disposed. The inclination angle of the guide face 61 can be an arbitrary angle at which the blower motor 30B can be guided toward the upper face of the battery stack 20 after the blower motor 30B hits the guide face 61.

Figure 14:
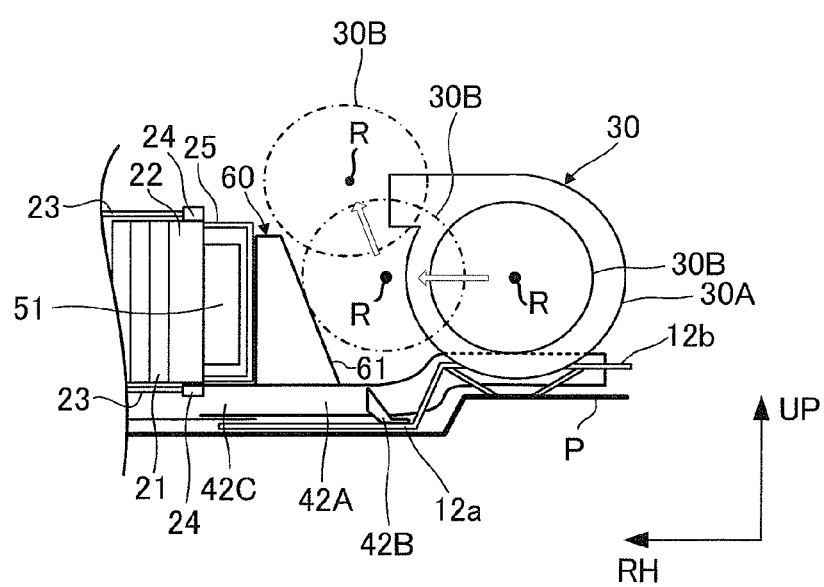
FIG. 14 A side view showing the movement track of a blower when an external force is applied thereto in Embodiment 2.

As shown in FIG. 14, upon application of the external force, the blower motor 30B is moved toward the side face of the battery stack 20 and comes into contact with the guide faces 61 of the ribs 60 disposed between the battery stack 20 and the blower 30. The blower motor 30B moved generally perpendicularly to the side face of the battery stack 20 is guided toward the upper face of the battery stack 20 by the guide faces 61. Similarly to Embodiment 1, a monitor unit 51 and a protecting member 25 can be disposed on the side face of the battery stack 20, and in this case, the ribs 60 are disposed closer to the blower 30 than the monitor unit 51.

In the present embodiment, the rib 60 disposed between the battery stack 20 and the blower 30 and formed on the duct portion 42A of the exhaust duct 42 is provided as the collision avoiding portion in Embodiment 1 and can prevent the collision of the blower motor 30B with the battery stack 20 and the monitor unit 51 upon application of the external force.

Although the present embodiment includes the ribs 60 provided for the overall side face of the battery stack 20, the present invention is not limited thereto. For example, outside the area where the monitor unit 51 is disposed, an end plate 22 can be formed to have a strength which can withstand the shock of the collision of the blower motor 30B with the side face of the battery stack 20 to protect the battery stack 20 from the collision of the blower motor 30B without providing the ribs 60. In the area where the monitor unit 51 is disposed, the ribs 60 can be disposed to avoid the collision of the blower motor 30B with the monitor unit 51.

The guide face 61 of the rib 60 may be provided as a guide face for guiding the blower motor 30B toward the lower face of the battery stack 20 when the motor 30B is moved toward the side face of the battery stack 20 upon application the external force. For example, instead of the guide face 61 inclined toward the battery stack 20 as shown in FIG. 13, the rib 60 having the guide face 61 inclined toward the blower 30 can be disposed on the exhaust duct 42 or an intake duct 32, so that the blower motor 30B can be guided toward the lower face of the battery stack 20 through the guide face 61.

Embodiment 3

Figure 15:
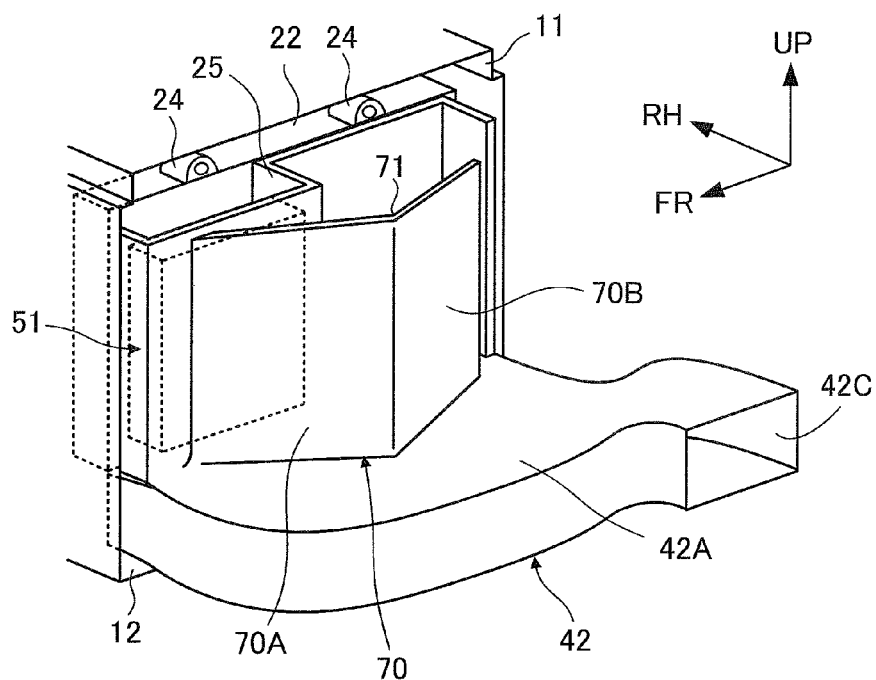
FIG. 15 An external perspective view of an exhaust duct provided with a rib (guide member) in Embodiment 3.

Embodiment 3 of the present invention will be described with reference to FIG. 15 and FIG. 16. FIG. 15 is an external perspective view of an exhaust duct 42 provided with a rib 70 (guide member). Members having the functions identical to those described in Embodiment 1 are designated with the same reference numerals, and detailed description thereof is omitted. The following description is mainly focused on differences from Embodiment 1.

In Embodiments 1 and 2, the duct portion 42A of the exhaust duct 42 is shaped to have the height increased in the UP direction within the space S3 between the battery pack 10 and the blower 30, and the exhaust duct 42 is provided with the ribs 60 having the guide faces 60, so that the blower motor 30B moved by the external force F1 or F2 is guided toward the upper face or the lower face of the battery stack 20. In the present embodiment, the rib 70 guides a blower motor 30B in the FR direction (toward a side face of a battery stack 20 in the FR direction) instead of the up-down direction of the battery stack 20, thereby preventing the collision with the battery stack 20 or a monitor unit 51.

As shown in FIG. 15, in the present embodiment, a duct portion 42A is formed to have an upper end face of flat shape (as a plane) similarly to Embodiment 2, and the rib 70 is formed on the upper end face of the duct portion 42A. The rib 70 is disposed between a side face of the battery stack 20 and a blower 30.

The rib 70 is a plate-shaped member inclined from a bent portion 71 extending in the UP direction toward the battery stack 20, and is formed of two plate-shaped ribs 70A and 70B extending generally vertically (UP direction) from the upper end face of the duct portion 42A. Both sides of the bent portion 71 of the rib 70 correspond to the plate-shaped ribs 70A and 70B. The rib 70 is formed as a wall portion which covers the side face of the battery stack 20 from the blower 30.

The plate-shaped rib 70A faces the blower 30 and faces toward the front in the FR direction, and is inclined from the bent portion 71 toward the side face of the battery stack 20 facing the blower 30. The plate-shaped rib 70B faces the blower 30 and faces toward the back in the FR direction, and is inclined from the bent portion 71 toward the side face of the battery stack 20 facing the blower 30. Each of the inclination angles of the plate-shaped ribs 70A and 70B can be an arbitrary angle at which the blower motor 30B can be guided toward the side face of the battery stack 20 in the FR direction after the blower motor 30B collides.

Figure 16:
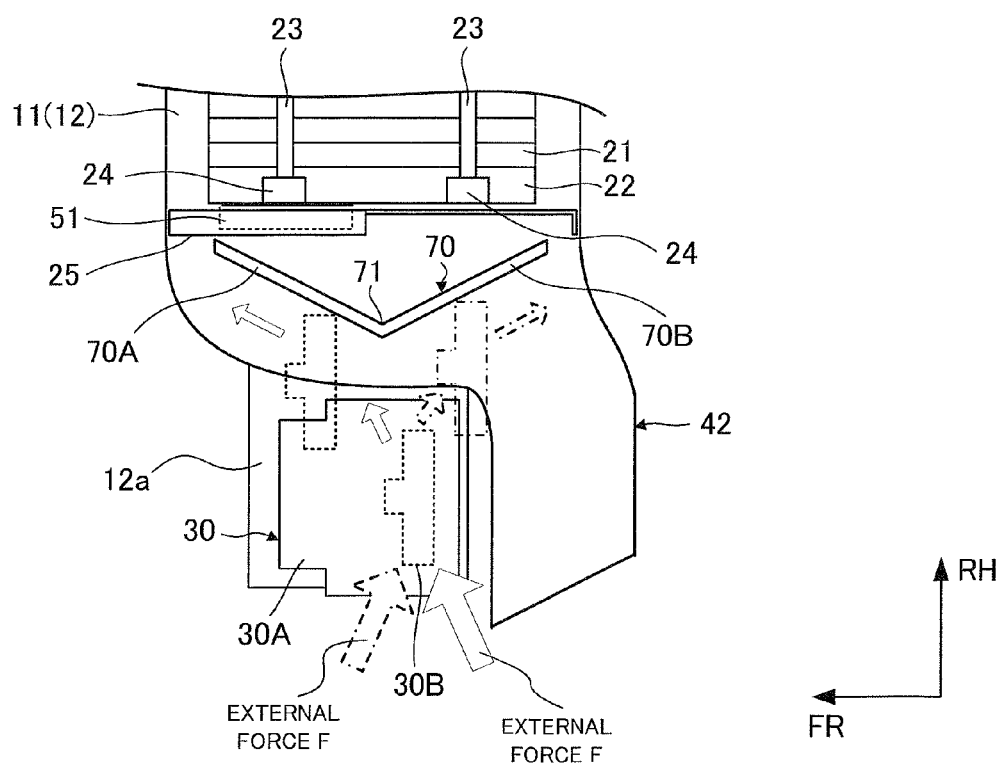
FIG. 16 A top view showing the movement track of a blower when an external force is applied thereto in Embodiment 3.

As shown in FIG. 16, when the blower motor 30B is moved toward the battery stack 20 in the RH direction upon application of an external force F, the blower motor 30B comes into contact with the rib 70 disposed between the battery stack 20 and the blower 30. Upon contact with the plate-shaped rib 70A, the blower motor 30B moved generally perpendicularly to the side face of the battery stack 20 facing the blower 30 is guided toward the front of the battery stack 20 in the FR direction by the plate-shaped rib 70A. Upon contact with the plate-shaped rib 70B, the blower motor 30B moved generally perpendicularly to the side face of the battery stack 20 facing the blower 30 is guided toward the back of the battery stack 20 in the FR direction by the plate-shaped rib 70B. Similarly to Embodiment 1, a monitor unit 51 and a protecting member 25 can be disposed on the side face of the battery stack 20 facing the blower 30, and in this case, the rib 70 is disposed closer to the blower 30 than the monitor unit 51.

In the present embodiment, the rib 70 disposed between the battery stack 20 and the blower 30 and formed on the duct portion 42A of the exhaust duct 42 is provided as the collision avoiding portion in Embodiment 1 and can prevent the collision of the blower motor 30B with the battery stack 20 and the monitor unit 51 upon application of the external force.

Although the present embodiment includes the rib 70 provided for the overall side face of the battery stack 20 opposite to the blower 30, the present invention is not limited thereto. For example, outside the area where the monitor unit 51 is disposed, an end plate 22 can be formed to have a strength which can withstand the shock of the collision of the blower motor 30B with the side face of the battery stack 20 to protect the battery stack 20 from the collision of the blower motor 30B without providing the rib 70. In the area where the monitor unit 51 is disposed, the rib 70 can be disposed to avoid the collision of the blower motor 30B with the monitor unit 51.

Although Embodiments 1 to 3 are described in conjunction with the use of the so-called square-type cell 21, the present invention is not limited thereto. The configuration of an assembled battery disposed adjacently to the blower 30 can be selected as appropriate.

For example, the assembled battery (corresponding to the electric storage unit) including so-called cylinder-type cells can be used instead of the battery stack 20. The cylinder-type cell is a cell having a circular cross section orthogonal to a longitudinal direction. Alternatively, a cell covered with a laminated film can be used as the cell 21. When the cell of the laminated type is used, a plurality of such cells can be stacked to constitute the assembled battery (corresponding to the electric storage unit).

Although Embodiments 2 and 3 are described with the example in which the upper end face of the duct portion 42A is formed in the flat shape (as the plane), the present invention is not limited thereto. For example, the upper end face of the duct portion 42A may have an inclined shape or a bumpy shape. In this case, each of the rib 60 and the rib 70 can be disposed to conform to the shape of the upper end face of the duct portion 42A.

The invention claimed is:
1. A vehicle comprising:
an electric storage unit having a plurality of electric storage elements and outputting an energy for use in running of the vehicle;
a blower disposed closer to the exterior of a body of the vehicle than the electric storage unit and supplying the electric storage unit with air for adjusting a temperature of the plurality of electric storage elements; and
a duct disposed between the electric storage unit and the blower and connected to the electric storage unit or the blower,
wherein the blower includes a blower motor forming a flow of the air to be supplied to the electric storage unit, and
the duct has a collision avoiding portion guiding the blower motor in an up-down direction of the electric storage unit when the blower motor is moved toward the electric storage unit upon application of an external force,
wherein the collision avoiding portion has an upper edge disposed at a height lower than a center of the blower motor by a predetermined value,
wherein the predetermined value is a value smaller than a radius of the blower motor, and
wherein, upon application of the external force that causes the blower motor to move toward the electric storage unit, the upper edge contacts with the blower motor.
2. A vehicle comprising:
an electric storage unit having a plurality of electric storage elements and outputting an energy for use in running of the vehicle;
a blower disposed closer to the exterior of a body of the vehicle than the electric storage unit and supplying the electric storage unit with air for adjusting a temperature of the plurality of electric storage elements; and
a duct disposed between the electric storage unit and the blower and connected to the electric storage unit or the blower,
wherein the blower includes a blower motor forming a flow of the air to be supplied to the electric storage unit, and
the duct has a collision avoiding portion guiding the blower motor in an up-down direction of the electric storage unit when the blower motor is moved toward the electric storage unit upon application of an external force,
further comprising a device disposed between the electric storage unit and the duct and used in controlling charge and discharge of the electric storage unit,
wherein the collision avoiding portion has an upper edge disposed at a height at which a distance between the upper edge and an upper end of the device located above the upper edge of the collision avoiding portion is less than a radius of the blower motor, and
wherein, upon application of the external force that causes the blower motor to move toward the electric storage unit, the upper edge contacts with the blower motor.
3. The vehicle according to claim 2, wherein the electric storage unit includes a pair of end plates between which the plurality of electric storage elements arranged along a predetermined direction are sandwiched in the predetermined direction, and further includes a coupling member extending in the predetermined direction and having both ends connected to the pair of end plates, the vehicle further comprising a protecting member protecting the device disposed on one of the end plates opposite to the blower, wherein the protecting member has a protruding portion disposed on a wall portion opposite to the upper end of the device, the protruding portion being adjacent to the coupling member in the predetermined direction.

4. The vehicle according to claim 1, wherein the collision avoiding portion is provided integrally with the duct by forming the duct to have an outer shape protruding into a space between the electric storage unit and the blower.

5. The vehicle according to claim 1, further comprising a case forming a flow path of the air on the periphery of the electric storage unit, wherein the duct is an exhaust duct connected to an exhaust port of the flow path.

6. The vehicle according to claim 1, wherein the plurality of electric storage elements are arranged along a predetermined direction, and the electric storage unit and the blower are arranged along the predetermined direction.

7. The vehicle according to claim 1, wherein the electric storage unit is disposed in a space formed below a seat cushion.

* * * * *